United States Patent [19]
Kelly et al.

[11] Patent Number: 6,085,890
[45] Date of Patent: Jul. 11, 2000

[54] HEAP LEACH STACKING PROCESS

[75] Inventors: Ronald R. Kelly, Poway; George M. Bernard, Chula Vista, both of Calif.

[73] Assignee: Terranova Technologies, Inc., El Cajon, Calif.

[21] Appl. No.: 09/112,979

[22] Filed: Jul. 9, 1998

[51] Int. Cl.[7] .................................................. B65G 65/02
[52] U.S. Cl. ............................................ 198/303; 198/586
[58] Field of Search .................................... 198/303, 508, 198/586, 588, 585, 594; 414/133

[56] References Cited

U.S. PATENT DOCUMENTS

| | | | |
|---|---|---|---|
| 1,996,488 | 4/1935 | Philips | 198/588 |
| 3,877,855 | 4/1975 | Hanson . | |
| 3,887,061 | 6/1975 | Hopkins | 198/508 |
| 4,038,764 | 8/1977 | Hanson . | |
| 4,106,226 | 8/1978 | Hanson . | |
| 4,206,840 | 6/1980 | Hanson . | |
| 5,377,810 | 1/1995 | Lehtonen et al. | 198/303 |
| 5,749,452 | 5/1998 | Hanson . | |

*Primary Examiner*—Christopher P. Ellis
*Assistant Examiner*—Khoi H. Tran
*Attorney, Agent, or Firm*—Price Gess and Ubell

[57] ABSTRACT

A method for forming a plurality of cells of material wherein a relocatable conveyor is located in front of an area in which the plurality cells are to be formed, and a portable conveyor system is disposed to transfer material from the relocatable conveyor to a material stacker. The portable conveyor system and material stacker are thereafter moved with respect to the relocatable conveyor in order to form a second of the plurality of material cells. A number of the portable conveyors of the portable conveyor system are then used to form the last of the plurality of material cells, while at the same time the relocatable conveyor system is being disassembled and moved to a second area wherein one or more additional cells of material are to be formed. In this manner, significant system down time conventionally experienced in moving a conventional shiftable conveyor is avoided.

5 Claims, 2 Drawing Sheets

HEAP LEACH STACKING PROCESS

BACKGROUND OF THE INVENTION

1. Field of the Invention

The subject invention relates generally to the mining industry and more particularly to an improved method for configuring and operating a heap leach stacking system.

2. Description of Related Art

Systems are known in the prior art including multiple conveyors for stacking cells of material to be subjected to heap leach stacking processes. Such systems are used for example for extracting copper or gold from stacked cells or "leach pads" of raw ore.

Conventional shiftable stacking systems builds a stack or "heap" of material parallel to a shiftable conveyor. The shiftable conveyor is relocated by a dozer which connects to a conveyor rail on which a tripper operates. This connection is achieved by means of a special attachment which allows the dozer to pull the conveyor sideways. Typically, a dozer snakes or moves the conveyor sideways 2 to 3 feet each time it runs up and down the shiftable conveyor. The shift sideways is equal to the arc of an associated radial stacker. This procedure entails multiple trips back and forth by the dozer and several days to accomplish. While shifting is gong on, the stacking process is disrupted.

OBJECTS AND SUMMARY OF THE INVENTION

The invention contemplates a method for forming a plurality of cells of material wherein a relocatable conveyor is located in front of an area in which the plurality cells are to be formed, and a portable conveyor system is disposed to transfer material from the relocatable conveyor to a material stacker. The portable conveyor system and material stacker are thereafter moved with respect to the relocatable conveyor in order to form a second of the plurality of material cells. A number of the portable conveyors of the portable conveyor system are then used to form the last of the plurality of material cells, while at the same time the relocatable conveyor system is being disassembled and moved to a second area wherein one or more additional cells of material are to be formed. In this manner, significant system down time conventionally experienced in moving a conventional shiftable conveyor is avoided. The number of overall equipment moves required is also significantly reduced, further reducing down time.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art.

Figure 1:
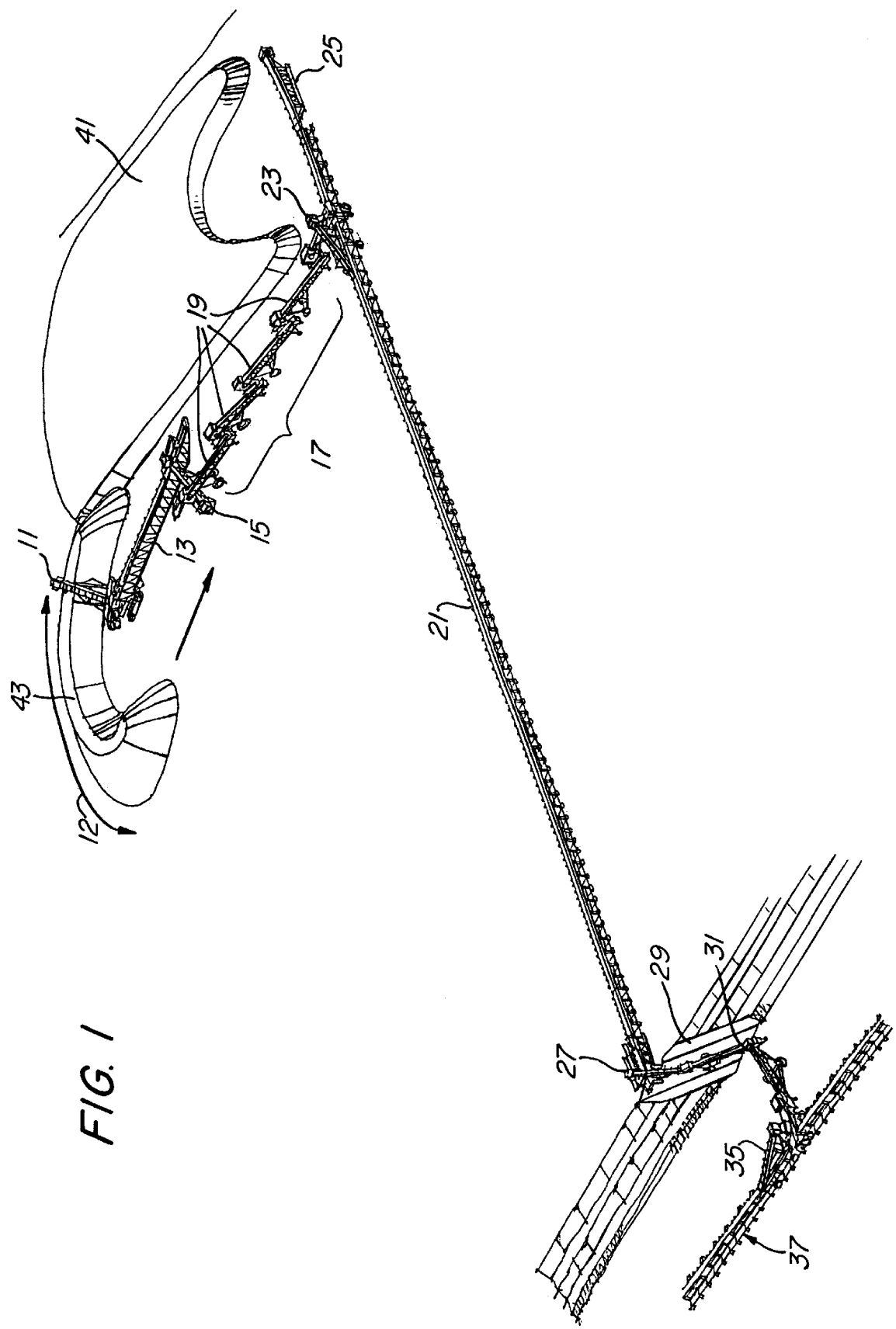
FIG. 1 is a perspective view illustrating the preferred embodiment at a first stage of cell building.

FIG. 1 illustrates a relocatable conveyor 21 disposed in front of an area in which a number of cells, e.g., 41, 43 of material are to be built. The cells 41, 43 are typically leach pads of ore-containing material. Disposed generally vertically to the relocatable conveyor 21 is a conveyor system including a conveyor subsystem 17 comprising a number of portable conveyors 19. The last of the portable conveyors 19 feeds a horizontal loader feeder conveyor 15. The loader feeder conveyor 15 in turn feeds a horizontal conveyor 13, which then feeds material to a radial stacker 11.

In FIG. 1, the radial stacker 11 is shown just beginning to build a second cell 43. In so doing, the radial stacker 11 reciprocates through an arc 12 and is moved rearwardly toward the relocatable conveyor while shortening the vertical conveyor system feeding the radial stacker 11. Such shortening may be accomplished, for example, by removing successive ones of the portable conveyors 19 or otherwise reorienting them. As an example of the relative size of such systems, the radial stacker 11 may be 120–140 feet long. The horizontal conveyor 13 may be 160 feet long while each of the portable conveyors 19 may be 150 feet long.

The relocatable conveyor 21 is per se conventional and is configured of a number of modules 22 (FIG. 2), which may be disassembled to relocate it. The relocatable conveyor 21 includes a belt tripper 23, a head section 25 and a tail section 27. The tail section of the relocatable conveyor 21 is fed by a number of standard ramp portable conveyors 31 located on an equipment service ramp 29. The standard or ramp portable conveyors 31 are fed by a belt tripper 35 located on another conveyor 37. The conveyor 37 brings the ore from either the crushing or aggregating plant.

It will be noted with respect to FIG. 1 that the vertically disposed conveyor system terminating in radial stacker 11 has already been used to build the first cell 41 and has been moved into a position adjacent to that cell and generally parallel to its first position in order to begin building the second cell 43. The portable conveyors 19 are preferably being repositioned to begin building the second cell 43 while the first cell 41 is being completed.

Figure 2:
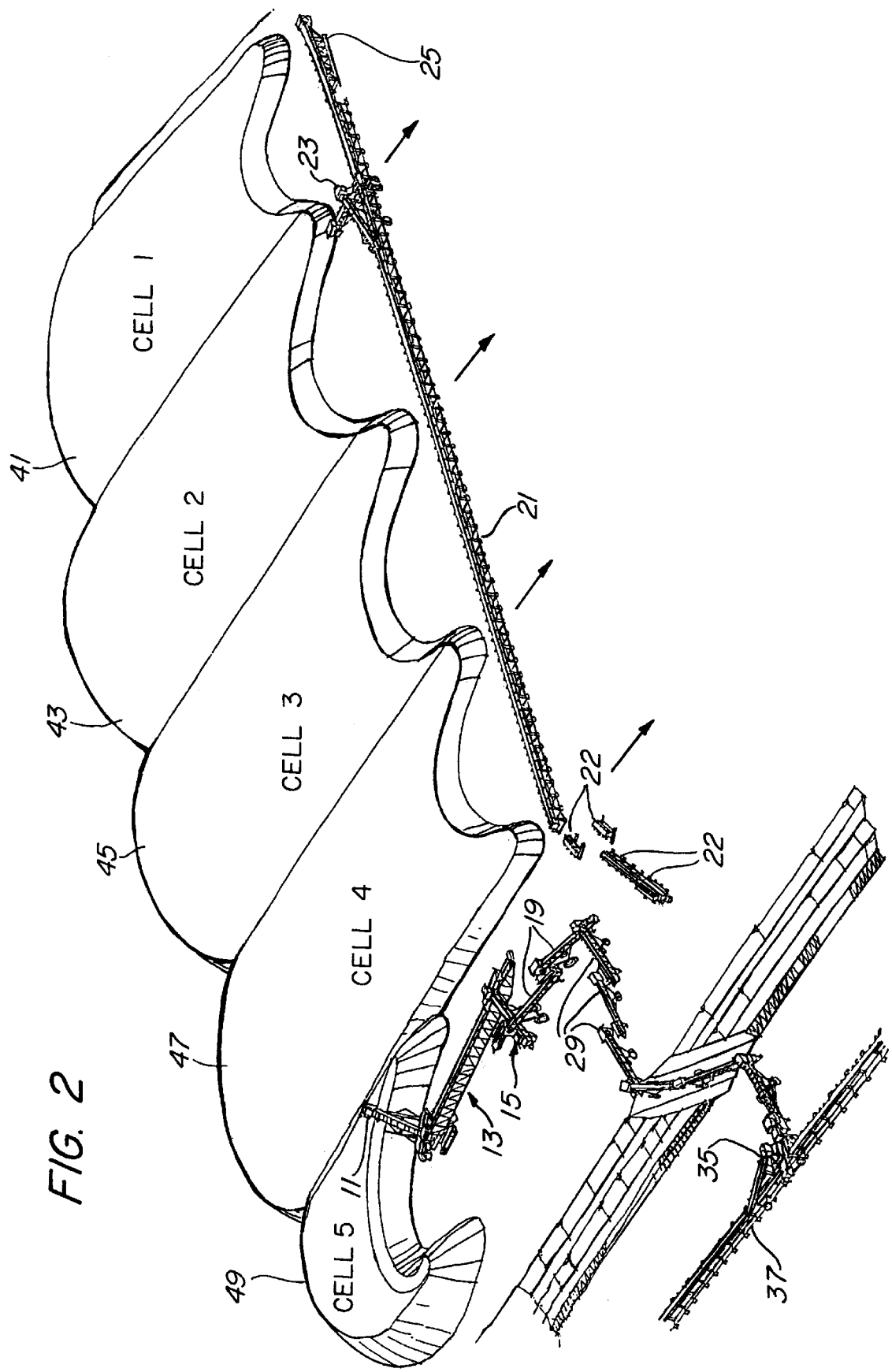
FIG. 2 is a perspective view illustrating a preferred embodiment near the end of building of a row of adjacent cells.

FIG. 2 illustrates the system operation at a later stage wherein four cells 41, 43, 45, 47 have been constructed and a final cell 49 in the row of cells is under construction. According to the preferred embodiment, a number of the multiple portable conveyors 19 are moved into position to transfer material from the ramp conveyor 31 to form the last cell 49, rather than using the relocatable conveyor 21 for that purpose. While the portable conveyors 19 are being used to build the last cell 49, the relocatable conveyor modules 22 are disassembled and moved to another position to reassemble and dispose the relocatable conveyor 21 in front of another cell deposition site. For example, the relocatable conveyor 21 may be moved rearward to a position parallel to that shown in FIG. 1 in order to build another row of cells. This disassembly and relocation of the relocatable conveyor 21 occurs while the last cell 49 is being layed out, thereby saving significant system down time, on the order of 2 - 4 days previously required to shift and relocate a conventional shiftable conveyor after using it to build the last cell 49.

The preferred embodiment, for example, may employ five portable conveyors 19 and a single feed conveyor 13. The five portable conveyors 19 may include one ramp (high HP) portable and four standard portables. The horizontal conveyor 13 may employ a conventional hydraulic drive with an oil containment system with a standard VFD electric, 8 tired, low ground pressure stacker design.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for forming a plurality of cells of material comprising:

locating a relocatable conveyor in front of an area in which a plurality of cells of material are to be formed;

disposing a portable conveyor system to transfer material from said relocatable conveyor to a material stacker;

moving said portable conveyor system and material stacker with respect to said relocatable conveyor in order to form a second of said plurality of cells; and employing a plurality of portable conveyors of said portable conveyor system to form the last of said plurality of cells while at the same time disassembling and moving said relocatable conveyor to a second area wherein one or more additional cells of material are to be formed.

2. The method of claim 1 wherein said material stacker is a radial stacker.

3. The method of claim 1 wherein said cells of material each comprise a leach pad of ore-containing material.

4. The method of claim 2 wherein said cells of material each comprise a leach pad of ore-containing material.

5. The method of claim 1 wherein a conveyor system feeds said relocatable conveyor during the forming of the first and second of said cells and wherein said plurality of portable conveyors transfers material from said conveyor system to said material stacker to form said last of said plurality of cells.

* * * * *